US008705759B2

(12) United States Patent
Wolff et al.

(10) Patent No.: US 8,705,759 B2
(45) Date of Patent: Apr. 22, 2014

(54) METHOD FOR DETERMINING A SIGNAL COMPONENT FOR REDUCING NOISE IN AN INPUT SIGNAL

(75) Inventors: Tobias Wolff, Neu-Ulm (DE); Markus Buck, Biberach (DE); Toby Christian Lawin-Ore, Darmstadt (DE)

(73) Assignee: Nuance Communications, Inc., Burlington, MA (US)

( * ) Notice: Subject to any disclaimer, the term of this patent is extended or adjusted under 35 U.S.C. 154(b) by 641 days.

(21) Appl. No.: 12/749,136

(22) Filed: Mar. 29, 2010

(65) Prior Publication Data

US 2010/0246844 A1 Sep. 30, 2010

(30) Foreign Application Priority Data

Mar. 31, 2009 (EP) .................................... 09004773

(51) Int. Cl.
*H04B 3/20* (2006.01)
*H04B 15/00* (2006.01)
*G10L 21/00* (2013.01)

(52) U.S. Cl.
USPC ............... 381/66; 381/93; 381/94.1; 704/226

(58) Field of Classification Search
USPC ............ 381/66, 94.1, 92, 63, 91, 95, 122, 93, 381/83; 704/226, 233; 700/94
See application file for complete search history.

(56) References Cited

U.S. PATENT DOCUMENTS 7,167,568 B2 * 1/2007 Malvar et al. ................... 381/66
7,620,172 B2 * 11/2009 Lin et al. .................. 379/406.08
8,073,147 B2 * 12/2011 Sugiyama ........................ 381/66
8,160,262 B2 * 4/2012 Buck et al. ....................... 381/66
8,165,310 B2 * 4/2012 Christoph et al. .............. 381/66
2007/0165871 A1 * 7/2007 Roovers et al. ................. 381/66
2008/0232607 A1 9/2008 Tashev et al. .............. 381/71.11
2011/0274291 A1 * 11/2011 Tashev et al. ................ 381/94.1

OTHER PUBLICATIONS

Habets et al; "Dual microphone speech deverberation in a noisy environment"; Jul. 6, 2006; IEEE; 0-7803-9754-1/06; p. 651-655.*

Cohen, I., et al., "Microphone Array Post-Filtering for Non-Stationary Noise Suppression," *IEEE Proc. ICASSP*, May 2002, pp. 1-4.

Ephraim, Y., et al., "Speech Enhancement Using a Minimum Mean-Square Error Short-Time Spectral Amplitude Estimator," *IEEE Transactions on Acoustics, Speech, and Signal Processing*, vol. ASSP-32, No. 6, Dec. 1984, pp. 1109-1121.

Griffiths, L., et al., "An Alternative Approach to Linearly Constrained Adaptive Beamforming," *IEEE Transactions on Antennas and Propagation*, vol. AP-30, No. 1, Jan. 1982, pp. 27-34.

Habets, E.A.P., et al., "Dual-Microphone Speech Dereverberation Using a Reference Signal," *IEEE*, 2007, pp. IV-901-IV-904.

Habets, E.A.P. "Multi-Channel Speech Dereverberation Based on a Statistical Model of Late Reverberation," *IEEE, ICASSP* 2005, pp. IV-173-IV-176.

(Continued)

*Primary Examiner* — Vivian Chin
*Assistant Examiner* — David Ton
(74) *Attorney, Agent, or Firm* — Daly, Crowley, Mofford & Durkee, LLP

(57) ABSTRACT

The invention provides a method for determining a signal component for reducing noise in an input signal, which comprises a noise component, comprising the steps of: estimating the noise component in the input signal, estimating a reverberation component in the noise component, and removing the estimated reverberation component from the estimated noise component to obtain a modified estimate of the noise component.

22 Claims, 12 Drawing Sheets

(56) References Cited

OTHER PUBLICATIONS

Ihle, M., "Differential Microphone Arrays for Spectral Subtraction," *International Workshop on Acoustic Echo and Noise Control*, Sep. 2003, pp. 259-262.
Ihle, M., et al., "A Novel Noise Suppression Algorithm Using a Very Small Microphone Array," *AES 109th Convention*, Sep. 22-25, 2000, pp. 1-5.
Tashev, I., et al., "Revereberation Reduction for Improved Speech Recognition," *Microsoft Research and Georgia Institute of Technology, School of ECE*, 2 pages.
Wolff, T. et al., "Spatial Maximum a Posteriori Post-Filtering for Arbitrary Beamforming," Harman/Becker Automotive Systems, *Acoustic Signal Processing Research*, 4 pages.
Abramson, A., et al., "Dual-Microphone Speech Dereverberation Using GARCH Modeling," *IEEE*, Mar. 31, 2008, pp. 4565-4568.
Habets, et al., "Speech Dereverberation Using Backward Estimation of the Late Reverberant Spectral Variance," *IEEE*, Dec. 3, 2008, pp. 384-388.
European Patent Office, Extended European Search Report; Application No. 09004773.9-2225; Jun. 2, 2009.

* cited by examiner

METHOD FOR DETERMINING A SIGNAL COMPONENT FOR REDUCING NOISE IN AN INPUT SIGNAL

PRIORITY

The present U.S. patent application claims priority from European patent application No. 09004773.9 filed on Mar. 31, 2009, entitled "Method for Determining a Signal Component for Reducing Noise in an Input Signal," which is incorporated herein by reference in its entirety.

TECHNICAL FIELD

The invention is directed to a method for determining a signal component for reducing noise in an input signal.

BACKGROUND ART

In the process of acquiring a signal with microphones, there is the general problem that disturbances are superimposed on the wanted signal. This is valid particularly if the wanted signal is a speech signal. Then, the disturbances may influence the communication over communication devices, e.g. telephones or hands-free communication devices. The capability of speech recognition software may be influenced to the negative by these disturbances.

In principle, prior art methods for reducing noise work in such a way that the disturbances in the input signal are estimated, and then, the estimated disturbances are removed from the input signal.

In particular, some multi-channel methods are described in the literature, using a beamformer in connection with an postfilter, wherein the postfilter is used to remove the disturbances which have been determined based on information from the multi-channel part.

A prior art system working differently is described by E. Habets, S. Gannot: Dual-Microphone Speech Dereverberation using a Reference Signal. In: Proc IEEE Int. Conf. Acoust., Speech, Signal Processing (ICASSP-07), Honolulu, Hawai, USA, 2007.

At the present, those methods which remove the estimated disturbances from the input signal have the disadvantage that playing back the output signal gives an unnatural sound impression, particularly if the wanted signal is a speech signal. Practical solutions which can be applied robustly are not yet in the state of the art.

SUMMARY OF THE INVENTION

In particular, the invention provides a method for determining a signal component for reducing noise in an input signal, which comprises a noise component, comprising the steps of: estimating the noise component in the input signal, estimating a reverberation component in the noise component, and removing the estimated reverberation component from the estimated noise component to obtain a modified estimate of the noise component.

The input signal may comprise a wanted component, in particular, it may comprise a speech signal. There may be periods where the wanted component is not present in the input signal.

The input signal may be provided in the form of a power density spectrum. Correspondingly, the estimated noise component, the estimated reverberation component and the modified estimate of the noise component may be provided in the form of a power density spectrum.

It has been found out by the inventors that the sound impression of an output signal resulting from noise reduction is considerably improved, particularly for speech signals, if a reverberation component which is present in the input signal is estimated and not considered as noise and not filtered out of the input signal.

The method may be carried out in an environment where reverberation occurs. The input signal may comprise a reverberation component which is the result of reverberations in the environment. The estimated reverberation component may comprise only a part of the reverberation component. In particular, the estimated reverberation component may comprise "early" reverberation components which are generated shortly after the sound event causing the reverberations has occurred.

The reverberation component may be caused by reflections of a sound signal. In general, the wanted signal may result from a direct sound component which is based on sound which has reached a microphone directly from the sound source without any reflections in the environment of the microphone. Besides, there may be indirect sound components which are based on sound which has reached the microphone after having been reflected on its way from the sound source to the microphone. The input signal may comprise components resulting from at least one indirect component. The reverberation component may result from an indirect sound component.

Removing the estimated reverberation component from the estimated noise component may comprise subtracting the estimated reverberation component, in particular, removing the estimated reverberation component may be performed by subtracting the estimated reverberation component from the estimated noise component.

The method may be continuously repeated. The method may be performed iteratively. Iterations of the method may be performed in regular time intervals.

Estimating the reverberation component may comprise filtering the input signal using an adaptive filter.

Estimating the reverberation component from the input signal allows a precise determination of the reverberation component in comparison to determining the reverberation component from another signal, for example, from the noise signal. Using an adaptive filter permits estimating of the reverberation component more exactly than by a filter which is not adaptive.

The adaptive filter may be a FIR filter. In particular, the FIR filter may be configured to filter the input signal in the form of a power density spectrum.

The method may comprise the step of adapting the adaptive filter.

The adaptive filter may be configured such that adapting the filter is based on power density spectra.

Adapting the adaptive filter may comprise determining one or more new filter coefficient for the adaptive filter. In principle, determining a new value for at least one filter coefficient may comprise setting a new value for the filter coefficient. The new value may be determined by adding or subtracting a value to/from the current value of the filter coefficient, in particular, by incrementing or decrementing the current value of the filter coefficient by a predetermined amount. The predetermined amount may be dependent on the difference between the estimated reverberation component and the estimated noise component.

In particular, the new filter coefficient may correspond to the most recent time when filtering is performed. Adapting the adaptive filter may be based on the input signal. The step of adapting the adaptive filter may be carried out only at times where a wanted component is present in the input signal. Hence, the method may comprise a step of detecting the presence of a wanted component. Further, the method may comprise a step of adapting the adaptive filter only if a wanted component has been detected.

A filter coefficient determined in an iteration of the method may depend on a filter coefficient which has been determined in a previous iteration of the method. Predetermined initial values may be provided for the first iteration. Initial values may also be determined based on a measured value.

The adaptive filter may be adapted such that the difference between the estimated reverberation component and the estimated noise component is minimized. Adapting the adaptive filter to minimize the difference between the estimated reverberation component and the estimated noise component may be based on the Normalized Least Mean Square (NLMS) algorithm.

The adaptive filter may be used to determine the estimated reverberation component because, if it is adapted, the filter has to try to reproduce the estimated noise signal from the input signal. An ideal filter, which succeeded in doing so, would provide the estimated noise signal as output. However, the adaptive filter may be configured in such a way that it may use, for adaptation, only information which spans a short period. The reason is that the adaptive filter may be chosen such that it has a low number of filter coefficients. So, if the adaptive filter tries to reproduce the estimated noise component, it can only reproduce noise components from the input signal which have been received a short time before. So, the adaptive filter may reproduce, in particular, those reverberation components which are close to the event which caused the reverberation.

The adaptive filter may be adapted such that its adapted filter coefficients are determined taking into account the input signal over a predetermined limited time period. The predetermined limited time period may end at the most recent time at which the adaptive filter is adapted.

The length of the adaptive filter may be at most 10 filter coefficients. In particular, the filter length may be at most 5 or at most 3 filter coefficients. The predetermined limited time period may be determined by the filter length of the adaptive filter.

The predetermined limited time period may be fixed, or may be adapted in dependence on the input signal. The predetermined limited time period may be frequency dependent.

The predetermined limited time period may be smaller than or equal to 150 milliseconds, in particular, smaller than or equal to 100 milliseconds, in particular, smaller than or equal to 50 milliseconds.

The presence of reverberation components in a sound signal following the sound of an event which caused the reverberation during those periods generate a more natural sound impression. Those reverberation component may be called "early" reverberation. The adaptive filter may be configured such that it provides an estimate for the components in the noise which follow closely to the sound of an event.

The environment where the method may be performed may be any space where sound may be reflected, and the reflected sound can be received at a location in the space together with sound which has not been reflected. The environment may also be a meeting room, an office, a concert hall, or a theatre. The environment where the method is performed may be a vehicular cabin.

The method may comprise the steps of detecting whether a wanted component is present in the input signal, and performing the step of adapting the adaptive filter and/or removing the estimated reverberation component only if a wanted component is detected.

In this way, it may be avoided to change the adaptation of the filter each time when the wanted component appears or disappears in the input signal. Instead, the adaptive filter may remain adapted to the wanted component during pauses of the wanted component. In addition, computing power for adaptation of the filter is saved in this way.

In addition, the step of estimating the noise component in the input signal, and/or the step of estimating the reverberation component in the noise component may be performed only if the wanted component is detected in the input signal. Detecting the wanted component may be based on the detecting step performed in connection with adapting the adaptive filter.

The step of detecting whether a wanted component is present may be based on the quotient of an estimate of the power of the input signal and an estimate of the power of the estimated noise component. The detecting step may be based on the signal strength of the input signal and the signal strength of the noise component.

The input signal may stem from at least one microphone. The microphones may be directional microphones. If the microphones are more than one microphone, they may be arranged in an array. If the microphones are arranged in an array, they are not directional microphones.

In particular, the input signal may be based on the output of a beamformer. The beamformer may be an adaptive beamfomer. The beamformer may be a delay-and-sum beamfomer. The input signal may be based on a sound signal which is received by the at least one microphones from a predetermined direction.

The step of detecting whether a wanted component is present may comprise detecting whether a sound signal is received by the at least one microphone from a predetermined direction.

The input signal may be provided in the form of at least one frequency subband signal.

The input signal may result from being separated into the at least one frequency subband signal. Separating the input signal may be executed by a filter bank. Separating the input signal into frequency subband signals may be based on a Fourier transformation. The method may comprise a step of transforming at least one signal from the time domain into the frequency domain, and/or from the frequency domain into the time domain.

The input signal and/or the frequency subband signals may be provided in the frequency domain. Alternatively or in addition, the input signals may be provided in the time domain. The input signal may be provided in a single frequency band.

The predetermined limited time period used in the step of adapting the adaptive filter may be frequency dependent. The predetermined limited time period may vary with the frequency.

Estimating the reverberation component in the noise component may comprise determining an estimate for a zero-average noise component with a temporal average of zero based on the estimated noise component.

In this way, the temporal average is removed from the estimated noise component.

The actual temporal average of the estimate of the zero-average noise component may be different from zero. The step of estimating the reverberation component in the noise component may comprise performing the step of filtering the input signal based on the estimate of the zero-average noise component.

The estimate of the zero-average noise component may be used in the step of adapting the adaptive filter instead of the estimated noise component. Using the estimate for the zero-average noise component makes adaptation of the adaptive filter more efficient. Using the estimate for the zero-average noise component may have the effect that the zero-average noise component has no bias and thus permits easier adaptation of the adaptive filter.

The step of determining the estimate of the zero-average noise component may be preceded by the step of determining a smoothed noise component based on the estimated noise component. A value of the smoothed noise component determined in an iteration of the method may depend on a value of the smoothed noise component which has been determined in a previous iteration. Predetermined initial values may be provided for the first iteration of the method. Initial values may also be determined based on a measured value.

The step of determining the estimate of a zero-average noise component may be based on the smoothed noise component. In particular, it may be based on subtracting the smoothed noise component from the estimated noise component. The step of determining the smoothed noise component may be preceded by a step of detecting whether a wanted component is present in the input signal. The step of determining the smoothed noise component may be performed only if no wanted component is detected.

The step of detecting whether a wanted component is present in the input signal may be performed only once if, in an iteration of the method, the step of adapting the adaptive filter is carried out as well.

The smoothed noise component may be an estimate for the noise component, where the trend of the noise component is indicated. The smoothed noise component may be determined iteratively, such that its value in an iteration of the method is dependent on the value in a previous iteration; particularly, in the immediately preceding iteration. An initial value may be provided for the smoothed noise component. The initial value may be predetermined, or based on a measured value.

The step of estimating the reverberation component may further comprise: determining an estimate of a zero-average input signal with a temporal average of zero based on the input signal, and performing the step of filtering the input signal using the estimate of the zero-average input signal.

In this way, the temporal average is removed from the input signal. The estimate of a zero-average input signal may be used as filter excitation signal. Using the estimate for the zero-average input signal may have the effect that the zero-average input signal has no bias and thus permits easier adaptation of the adaptive filter.

The actual temporal average of the estimate of the zero-average input signal may be different from zero.

The step of determining the estimate for the zero-average input signal may be based on the smoothed noise component. In particular, it may be based on subtracting the smoothed noise component from the input signal.

The step of adapting the adaptive filter may be performed based on the estimate of the zero-average input signal and/or the estimate of the zero-average noise component.

Estimating the noise component in the input signal may comprise blocking the wanted component in the input signal using a blocking matrix.

The blocking matrix may receive a plurality of signals. An input signal of the blocking matrix may stem from one or more a microphones. Generating the output signal of the blocking matrix may be based on at least one signal received by the blocking matrix and on an average of some or all of the signals received by the blocking matrix.

The invention further provides a method for reducing noise in an input signal, comprising performing the method for determining a signal component for reducing noise in an input signal provided by the invention to obtain the modified estimate of a noise component in the input signal, and filtering the input signal based on the modified estimate of the noise component.

The filter coefficient of the filter used for filtering the input signal may be restricted such that its value has to be greater than a minimum value, in particular, the filter coefficient may be restricted to non-negative values. These restrictions may be valid irrespectively of which type of filter is used.

The step of filtering the input signal may be performed by a Wiener Filter.

The input signal may be provided in the form of a sampled signal. The sampled signal comprises discrete sample values. In particular, the sample values have been determined at discrete times.

A sample value may describe the power of the input signal at the sample time. A sample value may describe the signal strength of the input signal at the sample time.

The step of adapting the adaptive filter may comprise the steps of identifying the input signal sample values which have been determined for times which are in the predetermined limited period of time. The step of adapting the adaptive filter may comprise forming an input signal vector from the identified input signal sample values. The step of adapting the adaptive filter may comprise modifying the filter coefficients of the adaptive filter based on the values of the components of the input signal vector, and on the value of at least one of the filter coefficients of the adaptive filter. Modifying the filter coefficients may be based on applying the Normalized Least-Mean-Square algorithm.

The invention also provides a computer program product comprising one or more computer-readable media having computer-readable instructions thereon for performing the steps of one of the method provided by the invention when run on a computer.

The invention also provides an apparatus for determining a signal component for reducing noise in an input signal, which comprises a noise component, the noise component comprising a reverberation component, comprising: noise estimating means for estimating the noise component in the input signal, reverberation estimating means for estimating the reverberation component in the noise component, and removing means for removing the estimated reverberation component from the estimated noise component to obtain a modified estimate of the noise component.

The means comprised in the apparatus are configured such that the methods of the invention may be carried out by the apparatus.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Exemplary embodiments of the invention will be described in the following. However, the invention is not limited to these examples.

In the following examples, signals and components are sampled signals, the sample values being determined at discrete sample times. The invention is not limited to the case of sampled signals or components.

Figure 1:
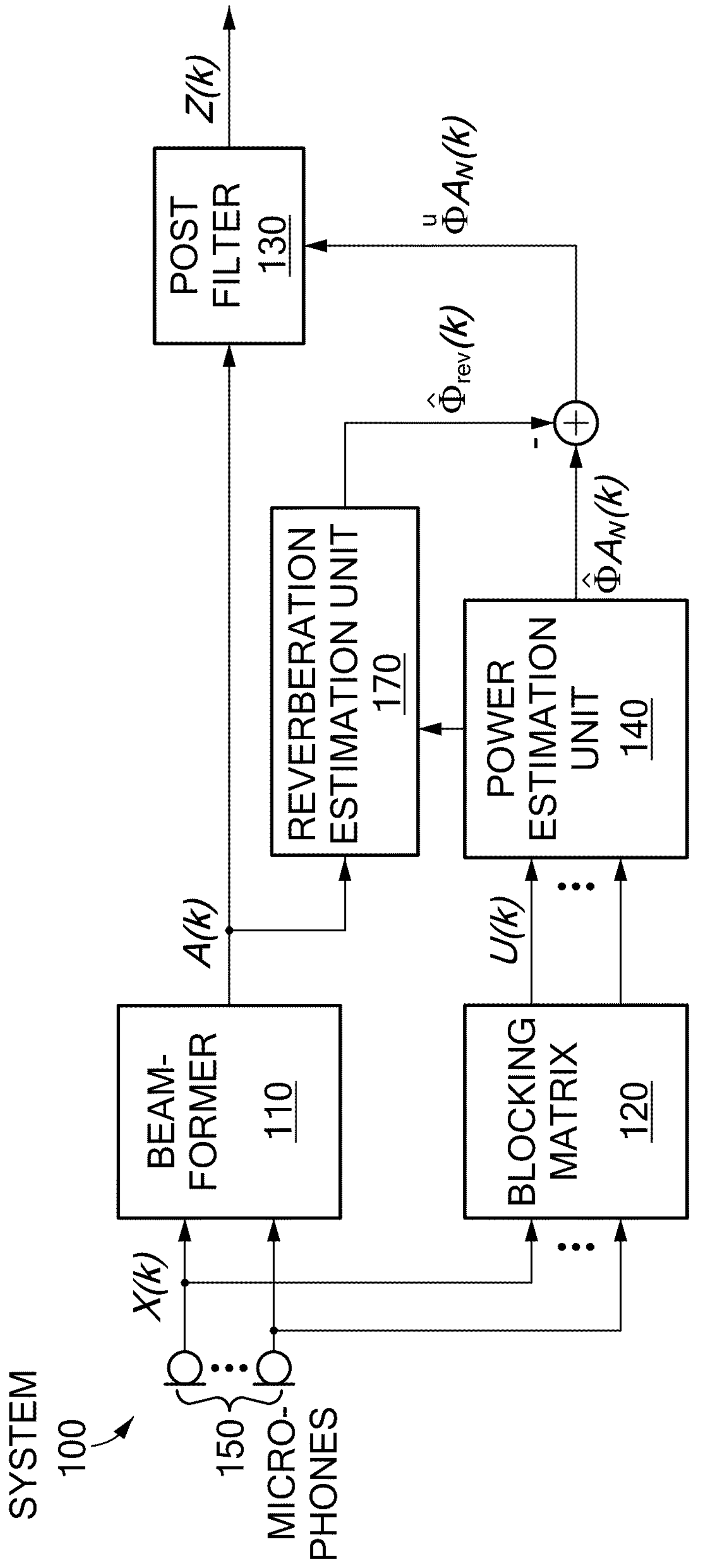
FIG. 1 illustrates an example for reducing noise based on the modified estimate of the noise component.
Figure 2:
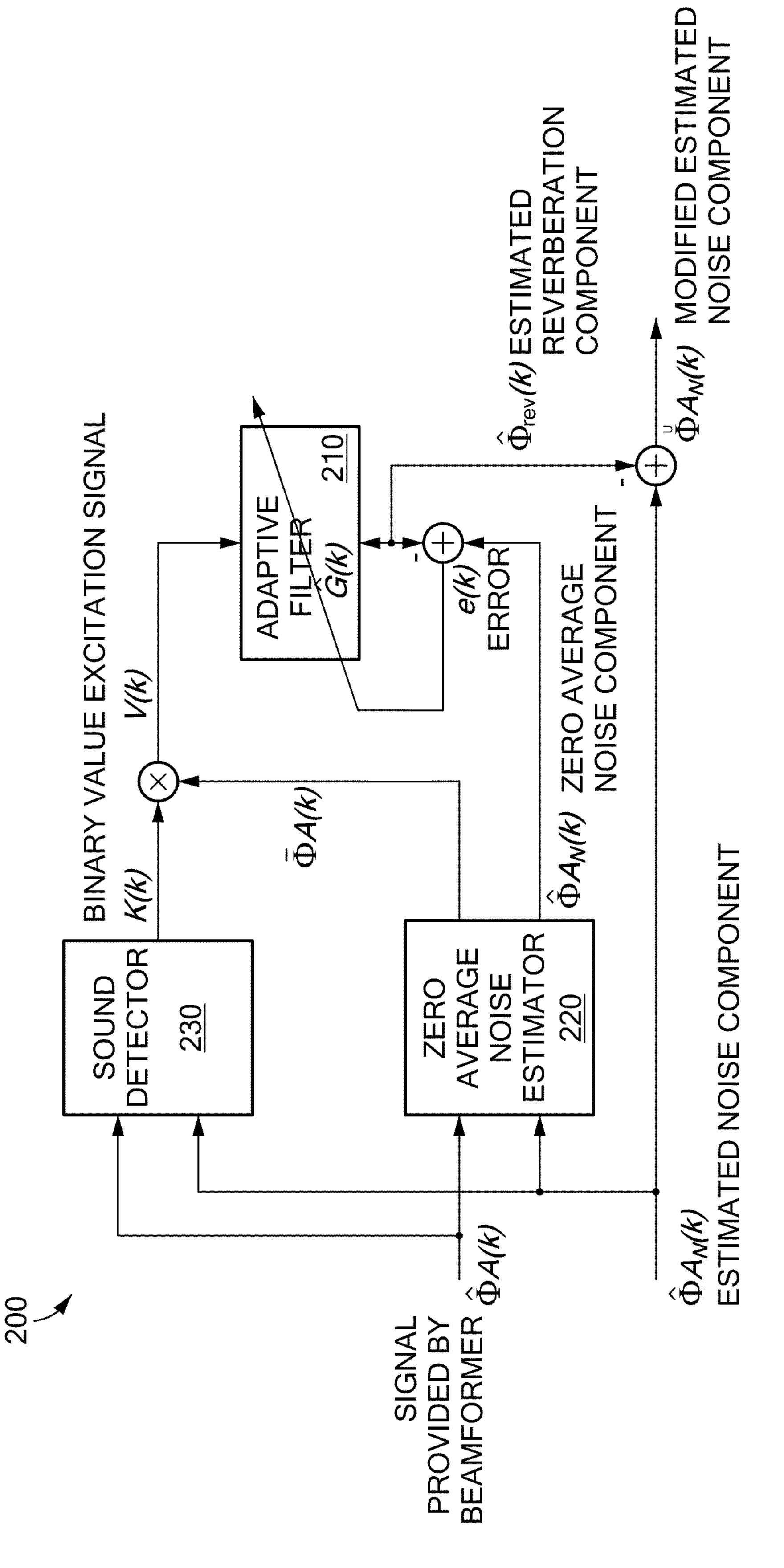
FIG. 2 illustrates an example of determining the modified estimate of the noise component for reducing noise.
Figure 3:
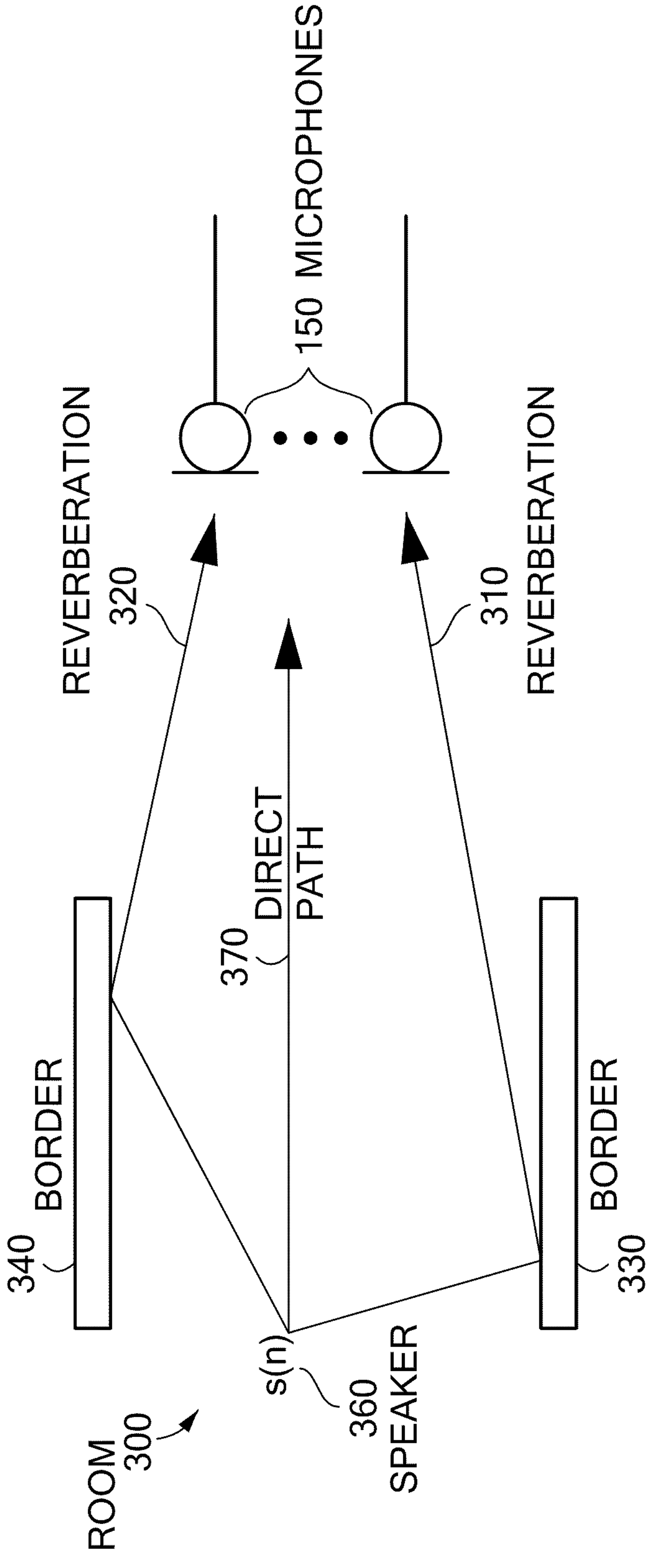
FIG. 3 illustrates an exemplary situation where a direct sound component and reverberation components are received by microphones.
Figure 4:
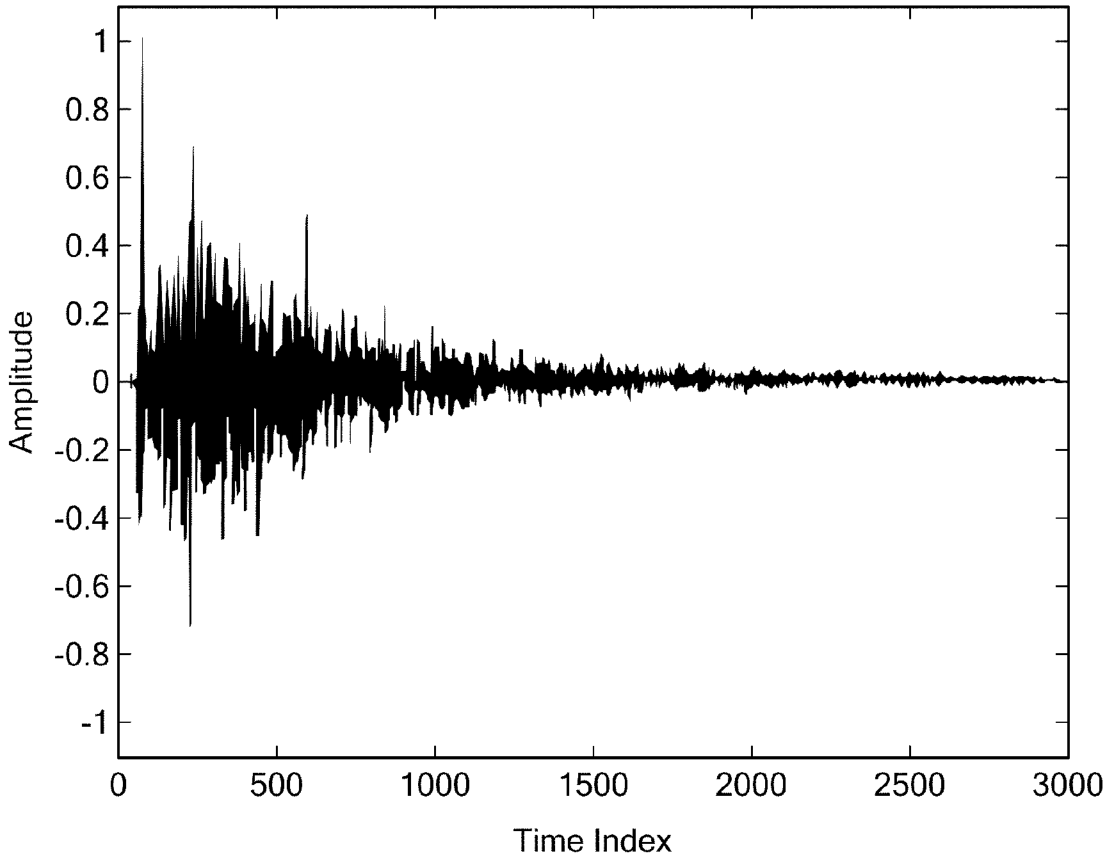
FIG. 4 illustrates an exemplary impulse response of a sound signal.

Before discussing the invention with regard to the diagrams of FIGS. 1 and 2, the propagation of sound in a room as illustrated by FIG. 3 is presented. If a sound source 360 (e.g. a speaker) is present in a room 300, reverberation 310, 320 arises caused by reflections at the borders 330, 340 of the room. The sound signal x(n), which is recorded by a microphone 350, may be described by:

$$x(n) = s(n) * h(n) \tag{1}$$

$$x(n) = \sum_{l=0}^{\infty} s(n-l)h(l) \tag{2}$$

s(n) indicates the signal as emitted by the speaker 360, and h(n) indicates the impulse response of the room 300. For the sake of simplicity, disturbing noise components are not considered here. However, these may be almost always present. An example for the impulse response of the room 300 is illustrated in FIG. 4. The first excursion may be caused by the direct path 370 from the speaker to the microphone. After that, the first reflected reverberation components 320 may arrive with a temporal delay. Afterwards, diffuse reverberation components 310 may arrive whose energy continues to decrease. Considering the speech intelligibility, only the first excursions of the impulse response may be beneficial. The late reverberation may deteriorate the speech intelligibility and affect the capability of speech recognition systems. The energy of the impulse response of the room typically decreases exponentially over time (H. Kuttruff: "Room acoustics", $4^{th}$ edition, London, Great Britain: Spon Press, 2000). The reverberation time $T_{60}$ is a measure for the speed of this decrease and is defined as the period over which the reverberation energy decreases by 60 db after switching off of the sound source.

The time signal x(n) may be separated into partial band signals using a filter bank for analysis. The resulting signal, transformed into the frequency domain, may be denoted by X(μ,k), where μ indices the frequency band. k denotes the time index of the subsampled signal (i.e. the block or frame index of the samples):

$$X(\mu,k)=X_D(\mu,k)+X_R(\mu,k) \tag{3}$$

$X_R(\mu,k)$ denotes the disturbing reverberation component, and $X_R(\mu,k)$ the wanted component of direct sound.

In general, signal processing as described in the following may be carried out on subbands of the signals in question. That is, an incoming signal may be separated into a set of subband signals, each subband signal belonging to a particular frequency range. Then, signal processing may be applied to the subband signals. At last, the processed subband signals may be assembled to obtain a modified outgoing signal. So, the index μ denoting a particular frequency subband may be omitted in the following. A signal X(μ,k) is just denoted by X(k) in the following but may be a signal in a subband.

The decreasing of the reverberation energy may be modeled with a fixed decreasing constant:

$$G(k) = \begin{cases} 0 & \text{for } k < 0, \\ 1 & \text{for } k = 0, \\ C \cdot e^{-\gamma k} & \text{for } k > 0. \end{cases} \tag{4}$$

The parameter C takes into account the relation of power between the direct sound and the reverberation. The parameter γ describes the decreasing of the power of the reverberation. While γ may mainly depend on the room parameters like size of the room of the absorption of sound at the walls, C may mainly depend on the position of the speaker in relation to the microphone position. So, the dissipation over time of the power of sound may be modeled.

$$\Phi_X(k) \approx \sum_{l=0}^{\infty} \Phi_{X_D}(k-l)G(l) \tag{5}$$

Herein, $\Phi_X(k)$ denotes the power of the input signal X at the time corresponding to sample value k. The components of direct sound in the frames may be assumed to be not correlated, even if this may not necessarily be the case. Then, the power of the components may interfere with each other by addition. The decrease in power may be distributed in a first part, which comprises the leading $L_H$ blocks which contribute to the power of the desired signal component, and in a subsequent part, which contributes to the power of the late reverberation.

$$\Phi_R(k) \approx \sum_{l=L_H}^{\infty} \Phi_{X_D}(k-l)Ce^{-\gamma l} \quad (6)$$

$$= \Phi_{X_D}(k-L_H)Ce^{-\gamma L_H} + \Phi_R(k-1)e^{-\gamma} \quad (7)$$

In reality, the non-reverberated signal component $X_D(k)$ may not be available. Therefore, to estimate its power, the estimated power of the input signal with reverberation may be used:

$$\Phi_{X_D}(k-L_H) \approx \Phi_X(k-L_H) \quad (8)$$

In this way, the power of the late reverberation may be estimated from the delayed signal spectrum and the previous estimate of the power of reverberation in a recursive way:

$$\hat{\Phi}_R(k)=|X(k-L_H)|^2Ce^{-\gamma L_H}+\hat{\Phi}_R(k-1)e^{-\gamma} \quad (9)$$

As the early reflections may be beneficial for the speech intelligibility, not only the component of direct sound may be estimated, but rather the convolution of direct sound and the early reflections. For this purpose, the parameter $L_H$ may be introduced. It may be predetermined. The corresponding period of time may be named "protection-time", because the early reflections are protected against a too strong reduction by the filter. The parameters C and γ may be strongly dependent on the actual acoustic situation and may be estimated during run time.

Spectral Subtraction is a block based method for suppressing noise, which works in the frequency range or in the range of a frequency subband. It may be assumed that the disturbed input signal consists of two uncorrelated components: the wanted component $X_D(k)$ and the noise component N(k)

$$X(k)=X_D(k)+N(k) \quad (10)$$

In Spectral Subtraction, real-valued filter coefficients H(k) are calculated with which the disturbed signal in each frequency subband and in each block may be adjusted with respect to the amplitude, such that an estimate for the wanted component $X_D(k)$ may be obtained:

$$\hat{X}_D(k)=X(k)H(k) \quad (11)$$

There may be various methods for determining the filter coefficients from the power of the input signal and the noise component. The most common may be the Wiener-Filter (other filters are, for example, described in: E. Hänsler, G. Schmidt: Acoustic Echo and Noise Control: A Practical Approach. Wiley IEEE Press, New York, N.Y. (USA), 2004).

$$H(k) = 1 - \frac{\Phi_N(k)}{\Phi_X(k)} \quad (12)$$

$\Phi_N(k)$ denotes the sample value at time k of the power density spectrum of the noise component and $\Phi_X(k)$ denotes the sample value at time k of the power density spectrum of the input signal. While $\Phi_X(k)$ may be estimated directly from the input signal X(k), it may often be problematical to estimate the noise component al $\Phi_N(k)$. Further details with respect to Spectral Subtraction may be read in S. Haykin: Normalized Least-Mean-Square Adaptive Filters. Adaptive Filter Theory, 4th edition, pages 320-343, Englewood Cliffs, N.J., Prentice Hall, 2002.

The method of Spectral Subtraction may also be used for suppression of reverberation, if the estimated reverberation component according to equation (9) is interpreted as noise component (I. Tashev, D. Allred: Reverberation reduction for improved speech recognition. In: Proc. Joint Workshop on Hands-free speech communication and microphone arrays, Piscataway, N.J. (USA), pages 18-19, May 2005; and: E. Habets: Multi-Channel speech dereverberation based on a statistical model of late reverberation. In: Proc IEEE Int. Conf. Acoust., Speech, Signal Processing (ICASSP-05), Philadelphia (UAS), Vol. 4, pages 173-173, May 2005).

$$\Phi_N(k):=\Phi_R(k) \quad (13)$$

It may be assumed here that the reverberation component R(k) and the wanted component $X_D(k)$ are uncorrelated, which may only be the case for large values of $L_H$. So, the weight factors may be determined according to $$H(k) = 1 - \frac{\Phi_R(k)}{\Phi_X(k)} \quad (14)$$

In addition, the range of values of the filter weights may be restricted such that the coefficients H(k) cannot be negative (which may happen by erroneous estimates). Often, a minimum value $H_{min}$ may be enforced so that a certain attenuation is not exceeded. This measure may help to reduce distortions of the wanted signal component, but this may have the cost of less reduction of the undesired components.

Figure 5:
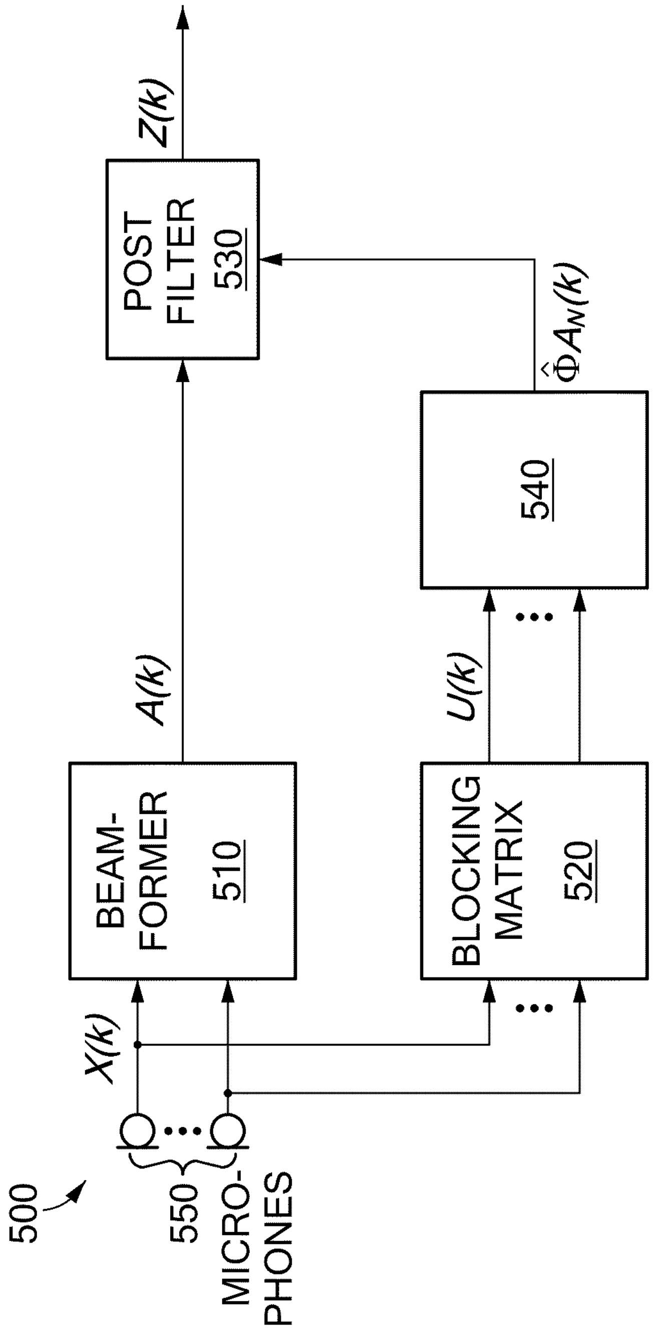
FIG. 5 illustrates an example of a method for improving the quality of a speech signal.

The system described in the following has the structure of a beamformer with postfilter, as already described above. In this way, a reduction of noise may be achieved as well as a dereverberating effect. FIG. 5 shows the signal flow in the system. However, by the method carried out by this system, no discrimination between early and late reverberation may be carried out. Therefore, the early reverberation may be suppressed as well. The consequence may be disturbing artifacts in the output signal. The invention has to be seen as an enhancement of this method which only suppresses, besides noise, the undesired late reverberation, as is described below. Hence, the enhanced method may also be seen as a method for dereverberation.

The operation of the postfilter 530 of the beamformer 510 may be based on using a so-called blocking matrix 520 (L. Griffiths, C. Jim: An alternative approach to linearly constrained adaptive beamforming. IEEE Trans. on Antennas and Propagation, Vol. 30, No. 1, pages 27-34, January 1982; and: M. Brandstein, D. Ward: Microphone arrays: Signal processing techniques and applications. Springer Verlag, Berlin (Germany), 2001) to separate the wanted component from the noise component. The Q output signals $U_q(k)$ of the blocking matrix 520 may then be used to estimate the noise component $\hat{\Phi}_{A_N}(k)$ which is to be reduced in the output signal of the beamformer 510 by the postfilter 530. As the blocking matrix 520, in an ideal case, may remove all desired components, these may not be reduced by the postfilter 530.

To achieve this, first of all, the average estimated power of the output signals of the blocking matrix 520 may be computed:

$$\overline{\Phi}_U(k) = \frac{1}{Q}\sum_{q=1}^{Q} \hat{\Phi}_{U_q}(k) \quad (15)$$

As the blocking matrix 520 may influence the spectrum of the remaining components to some degree, and as, in addition, the beamformer 510 may cause a noise reduction, an adaptation of the averaged estimated power of the output signal of the blocking matrix to the output of the beamformer 510 may be carried out. Otherwise, the noise power might be overestimated, which may result in signal distortions. The adaptation of the powers may be achieved via a factor $W_{eq}(k)$ which may be determined adaptively during speech pauses. As this factor may be determined mainly by the spatial properties of the noise field, it may change slowly in comparison to the power of the signals. Hence, an estimated noise component $\hat{\Phi}_{A_N}(k)$ at the output of the beamformer 510 may be derived as follows:

$$\hat{\Phi}_{A_N}(k)=\overline{\Phi}_U(k)\cdot W_{eq}(k) \quad (16)$$

So, in the process of using a postfilter 530 in connection with a beamformer 510, the reduction of the disturbing components at the beamformer output may be carried out by weighting the beamformer output spectrum A(k) with the filter coefficients H(k) of the postfilter 530:

$$Z(k)=A(k)\cdot H(k) \quad (17)$$

where the filter coefficients H(k) may be computed according to the Wiener response curve:

$$H(k) = 1 - \frac{\overline{\Phi}_U(k)\cdot W_{eq}(k)}{\hat{\Phi}_A(k)} \quad (18)$$

These filter coefficients may be subjected to further statistic optimization to obtain an increased temporal dynamic, which may have a positive effect to the sound performance. Details with respect to this method of postfiltering may be read in: T. Wolf, M. Buck: Spatial maximum a posteriori post-filtering for arbitrary beamforming, Proceedings Joint Workshop on Hands-Free Speech Communications and Microphone Arrays (HSCMA '08), 2008.

As already mentioned above, the described method has the advantage that a robust detection of noise may be achieved as well as a dereverberating effect. This effect may be caused by the fact that the blocking matrix 520 essentially suppresses the direct sound component of the input signal. The reverberation components may not be suppressed by the blocking matrix 520 because the filters of the blocking matrix 520 may not simulate these components. So, the postfilter 530 may attribute all signal components at the output of the blocking matrix to the noise components. In this way, all reverberation components as well as disturbing noise may be reduced by the postfilter 530. However, it may be problematic that the blocking matrix 520 may let pass the early reverberation components. Even if there may be various possibilities to realize a blocking matrix 520 which has a different behavior with respect to the suppression of early reverberation components, the remaining power of the early reverberation components in the output of the blocking matrix 520 may still be too high.

Figure 6:
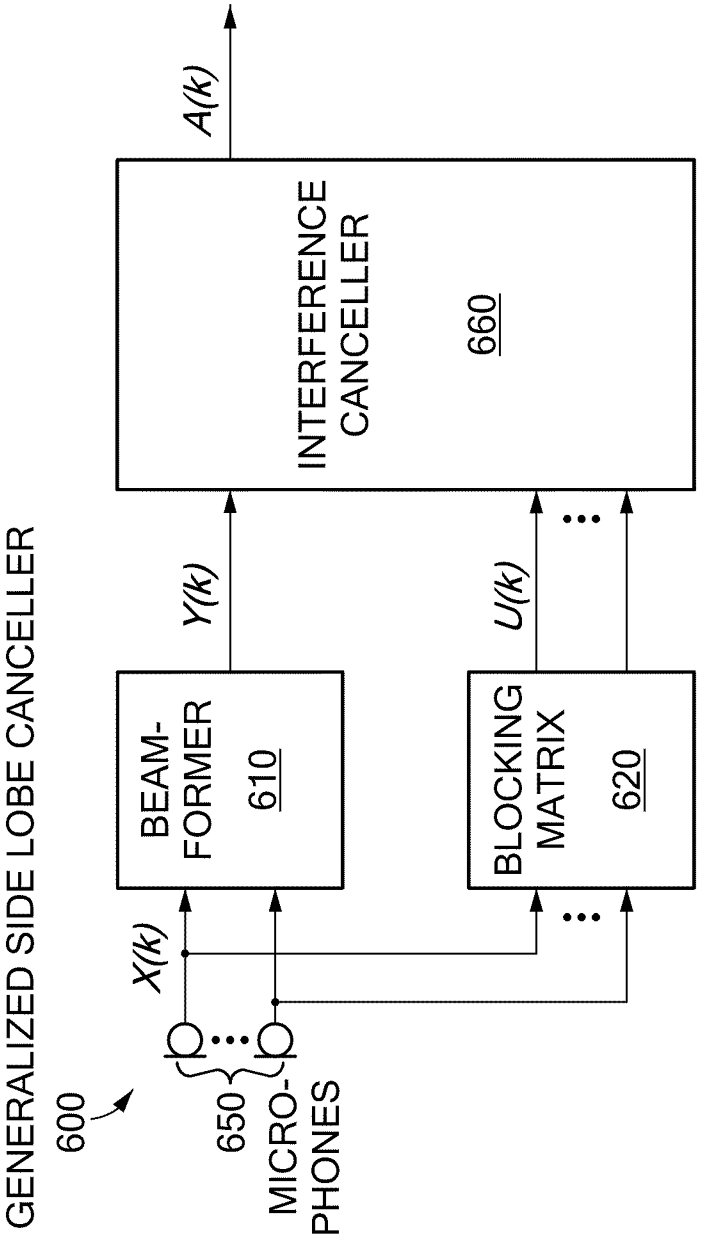
FIG. 6 illustrates an example of the structure of a Generalized Sidelobe Canceller.
Figure 7A:
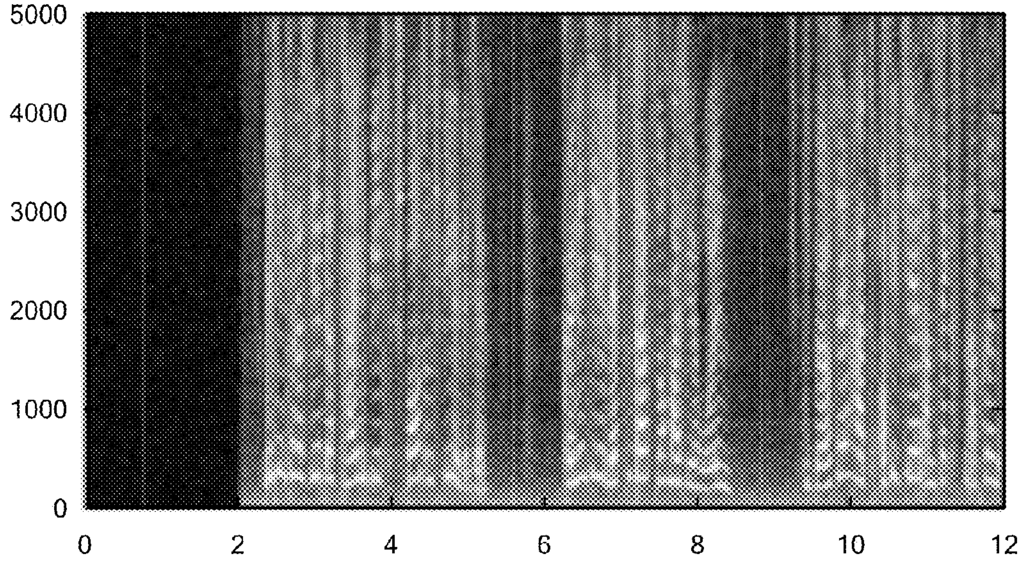
FIG. 7 illustrates in an exemplary way the power spectrum and the time signal of an input signal without any reverberation components (parts a and b) and of an input signal with reverberation components (parts c and d)
Figure 7B:
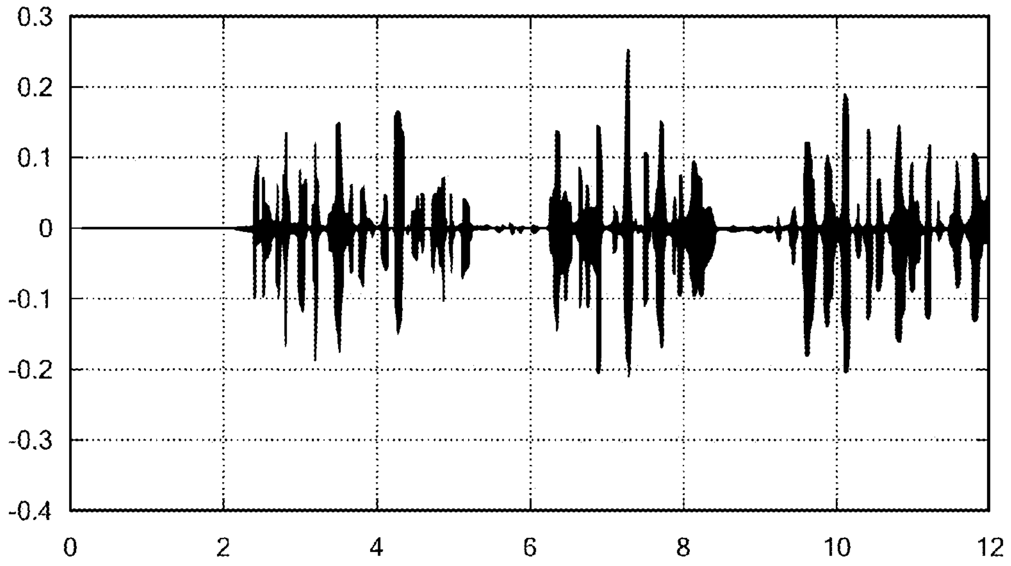
Figure 7C:
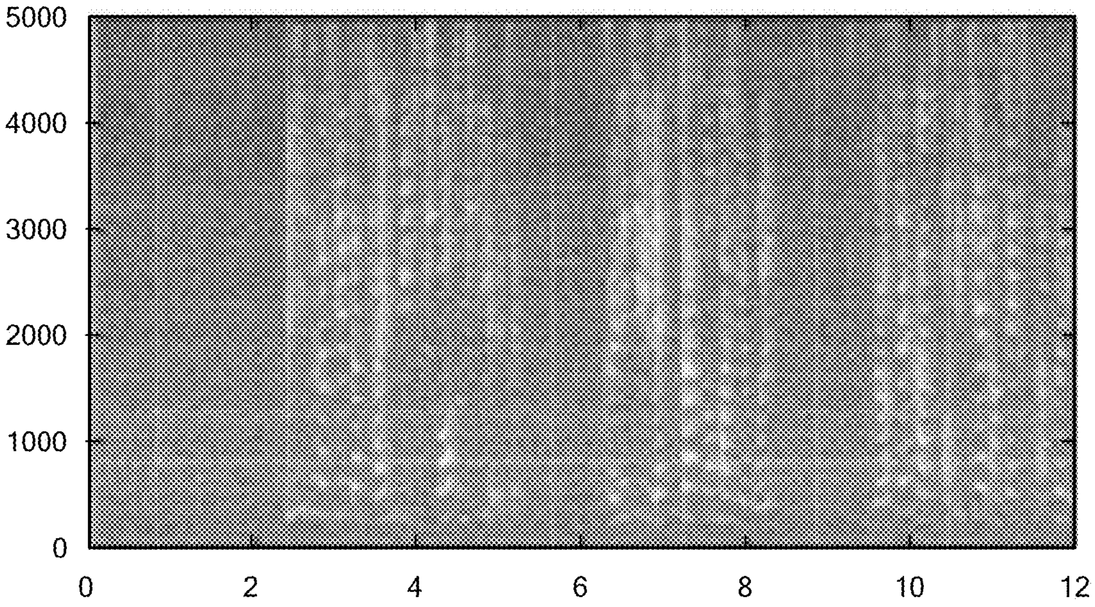
Figure 7D:
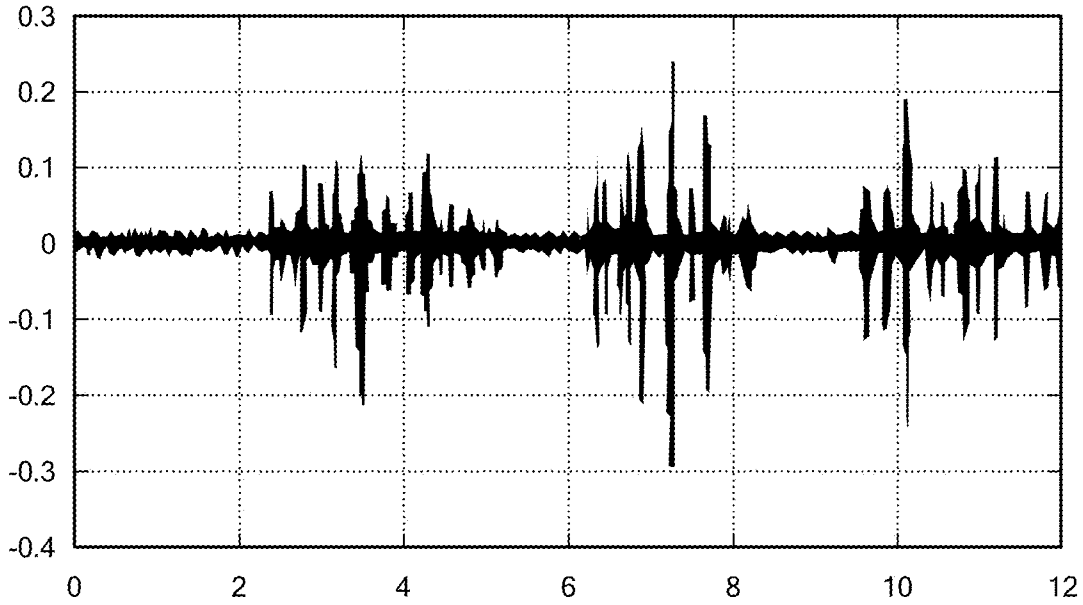

The method of using an postfilter 530 as illustrated in FIG. 5 may be combined with arbitrary beamformer concepts. In particular, an adaptive beamformer may be used. An adaptive beamformer may be realized with particular efficiency in a so-called Generalized Sidelobe Canceller (GSC) structure (see L. Griffiths, C. JIM 1982). Its structure is illustrated in FIG. 6. The GSC structure 600 itself comprises a blocking matrix 620, therefore, the postfilter may work with existing signals from the GSC structure. Furthermore, the GSC 600 may comprise a fixed (time-invariant) beamformer 610, which is, in the following, assumed to be a delay-and-sum beamformer. The third component of the GSC structure is the Interference Canceller 660. This component may process the output signals of the blocking matrix 620 in such a way that an estimate for the noise at the output of the fixed beamformer 610 is generated. The noise may then be compensated by the interference canceller 660 in the output signal of the beamformer 610. In this way, an increased directivity at low frequencies may be possible. Furthermore, coherent disturbances may be suppressed as well.

In the following, the composition of some signals in the GSC structure is discussed as a basis for the description of the new system further below.

Like the decomposition of the signals in the time domain, corresponding components may also be distinguished in the domain of frequency subbands. Consequently, the frequency subband signal at the output of a delay-and-sum beamformer 610 may be described as follows:

$$Y(k) = \frac{1}{M}\sum_{m=1}^{M} X_m(k) \quad (19)$$

$$= \frac{1}{M}\sum_{m=1}^{M} (X_{D_m}(k) + X_{R_m}(k) + X_{N_m}(k)) \quad (20)$$

$$= Y_D(k) + Y_R(k) + Y_N(k) \quad (21)$$

$Y_D(k)$ and $Y_R(k)$ denote the direct sound component and the reverberating components at the output of the fixed beamformer 610.

To generate the signal $U_m(k)$ at the output of the blocking matrix 620, one possibility may be to filter Y(k) with an adaptive filter and to subtract it from the respective microphone signal:

$$U_m(k) = X_{D_m}(k) + X_{R_m}(k) + X_{N_m}(k) - \sum_{i=0}^{L-1} W_i^*(k)Y(k-i) \quad (22)$$

$$= X_{D_m}(k) + X_{R_m}(k) + X_{N_m}(k) - \breve{Y}_D(k) - \breve{Y}_R(k) - \breve{Y}_N(k) \quad (23)$$

$$= U_{D_m}(k) + U_{R_m}(k) + U_{N_m}(k) \quad (24)$$

As can be seen, the signals at the output of the blocking matrix 620 may also consist of reverberation components, noise components and components of the wanted signal which have not been filtered out. In practice, their remainders $U_{D_m}(k)$ may remain in the signals $U_m(k)$ for several reasons: The speaker may not be located in the far field of the microphone array, as is often assumed in the design of a blocking matrix. Moreover, the microphone array (or its zero point, respectively) may not optimally be directed to the speaker. The reverberation components may remain in the output signal of the blocking matrix because it may have too few degrees of freedom to simulate the reverberation, or it may not be adjusted correctly.

If the array is perfectly adjusted to the speaker and the speaker is located in the far field, equation (24) may be shortened to:

$$U_m(k)=U_{R_m}(k)+U_{N_m}(k) \quad (25)$$

which may be problematic for the postfilter because of the reverberation components. In practice, those assumptions may not apply, so that even a remainder of direct sound may remain present. The following is based on equation (25).

The signal Y(k) may be processed by the interference canceller 660 which may generate an estimate for $Y_N(k)$. The estimate may be optimized such that, when it is subtracted form the output signal of the beamformer 610, its remainder in the output of the interference canceller 660 is minimized. The output signal of the GSC 600 also may have the already known composition:

$$A(k) = A_D(k) + A_R(k) + A_N(k) \quad (26)$$

$$= A_S(k) + A_N(k) \quad (27)$$

$A_D(k)$ again denotes the direct sound component, $A_R(k)$ the reverberation component and $A_N(k)$ the remaining noise which could not be removed by the GSC 600. In addition, the identifier $A_S(k)$ for the speech signal with reverberation at the output of the GSC 600 may be introduced. As described below, A(k) may be fed into a postfilter and be subjected to a final processing by the postfilter.

In the following, an expression for the power at the output of the blocking matrix 620 in an GSC 600 is derived. The formulation for the new system will be given later based on this expression. In analogy to the consideration in the time domain, the reverberation component corresponding to the wanted signal in the subband signals $U_q(k)$ may be considered as convolution of the direct sound component in a microphone signal with the impulse response in a subband:

$$U_{R_q}(k) = \sum_{j=0}^{L-1} X_D(k-j)H_q(j) \quad (28)$$

$$\Rightarrow U_q(k) = \sum_{j=0}^{L-1} (X_D(k-j)H_q(j)) + U_{N_q}(k) \quad (29)$$

The parameter L denotes the length of the a hypothetical subband filter. According to the far field assumption, it is supposed in equation (29) that the direct sound component is equal in all microphone signals. Hence, the index m may be omitted at the direct sound components. The output power of the blocking matrix 620 may be computed like:

$$\Phi_{U_q}(k)=E\{U_q(k)U^*_q(k)\} \quad (30)$$

Here, the operator E {.} denotes the computation of the expected value and by (.)*, the conjugate-complex is described. As an example, for L=2, one obtains:

$$\Phi_{U_q}(k)=E\{(X_D(k)H_q(0)+X_D(k-1)H_q(1)+U_{N_q}(k))\cdot(X_d(k)H_q(0)+X_D(k-1)H_q(1)+U_{N_q}(k))^*\} \quad (31)$$

By multiplying and computing of the expected value, this becomes:

$$\Phi_{U_q}(k) = \Phi_{X_D}(k)|H_q(0)|^2 + \Phi_{X_D}(k-1)|H_q(1)|^2 + \Phi_{U_{N_q}}(k) + \ldots \underbrace{E\{X_D(k)X_D^*(k-1)\}}_{0}H_q(0)H_q^*(1) + \underbrace{E\{X_D(k)U_{N_q}^*(k)\}}_{0}H_q(0) + \ldots \underbrace{E\{X_D(k-1)X_D^*(k)\}}_{0}H_q^*(0)H_q(1) + \underbrace{E\{X_D(k)U_{N_q}^*(k)\}H_q(1)}_{0} \quad (32)$$

At this point, it may be assumed that the direct sound component in the previous block and in the current block are not correlated. Furthermore, it may be assumed that the direct sound and the noise are independent. In general, one obtains for arbitrary L≥1:

$$\Phi_{U_q}(k) = \sum_{j=0}^{L-1} (\Phi_{X_C}(k-j)|H_q(j)|^2) + \Phi_{U_{N_q}}(k) \quad (33)$$

By computing the average corresponding to equation (15), one may finally obtain from this expression the average blocking matrix power $\hat{\Phi}_U(k)$:

$$\Phi_U(k) = \frac{1}{Q}\sum_{q=1}^{Q}\sum_{j=0}^{L-1} (\Phi_{X_D}(k-j)|H_q(j)|^2) + \Phi_{U_N}(k) \quad (34)$$

$$= \sum_{j=0}^{L-1} \Phi_{X_D}(k-j)\underbrace{\frac{1}{Q}\sum_{q=1}^{Q}|H_q(j)|^2}_{G(j)} + \Phi_{U_N}(k)$$

$$\Rightarrow \Phi_{U_R}(k) = \sum_{j=0}^{L-1} \Phi_{X_D}(k-j)G(j)$$

Based on the described assumptions, the average reverberation power $\hat{\Phi}_{U_R}(k)$ at the output of the blocking matrix may be described as convolution of the power of the direct sound component with an impulse response G.

It should be noted that in the time domain, the early reverberation components may be, in principle, clearly distinguished from the direct sound component, because they appear later in time. However, this may not be necessarily correct in the subband domain. Here, the power of the early reverberation components may appear together with components of direct sound at the same time, because they may appear in the period of time which is associated with one frame. A typical value for the length of a frame may be 256 sampling points, which corresponds to a period of 23 milliseconds at a sampling frequency of 11025 Hz. Dependent on the configuration of the subband system, longer periods may be possible. In such a period, the direct sound component and a reverberation component may definitely interfere. The power of a subband observed in a frame at a time index k may include components of direct sound and of reverberation. Therefore, a temporal separation between direct sound and early reverberation may be, in general, not possible in the subband domain. Correspondingly, both types of components may be taken into account by the postfilter. In these cases, the signal may not deliver the impression of a natural sound.

To correct this behavior, a method has been developed which allows to explicitly estimate the early reverberation components, so that these components may be attributed to the desired components. Thereby, the early reverberation components may be estimated based on correlations in time with the wanted signal component. These correlations may be simulated by an active filter.

The system achieves jointly using spatial as well as temporal criteria and leads to a new way of processing the speech signal. According to informal hearing tests, this innovation leads to an improved sound impression compared to the previous state of the art.

In the following, a method of determining a modified estimate of the noise component in an input signal in accordance with an embodiment of the present invention is described. FIG. 1 illustrates a system 100 for performing the described method. Some of the signals involved in the method and their relations are illustrated by FIG. 2. The operations implied by generating or modifying the signals shown in FIG. 2 may be performed by the reverberation estimating unit 170.

In the system described before, the Q output signals $U_q(k)$ of the blocking matrix 120 may be used to estimate the power of the estimated noise components $\hat{\Phi}_{A_N}(k)$ in the power estimation unit 140 which are to be reduced in the output signal of the beamformer 110 by the postfilter 130. There may be two components in the estimated noise component:

$$\hat{\Phi}_{A_N} = W_{eq}(k)\hat{\Phi}_U(k) \quad (35)$$

$$= \underbrace{W_{eq}(k)\hat{\Phi}_{U_R}(k)}_{\Phi_{rev}(k)} + W_{eq}(k)\hat{\Phi}_{U_N}(k) \quad (36)$$

The first component denoted by $\Phi_{rev}(k)$ may cause the above-mentioned problems by including early and late reverberation components.

In the following, an embodiment of a new method for obtaining an estimated reverberation component $\hat{\Phi}_{rev}(k)$ is described. The estimation may be carried out using an adaptive filter 210. The estimated reverberation component may then be subtracted from the state of the art estimated noise component value $\hat{\Phi}_{A_N}(k)$ to obtain a modified estimate of the noise component $\check{\Phi}_{A_N}(k)$:

$$\check{\Phi}_{A_N}(k)=\hat{\Phi}_{A_N}(k)-\hat{\Phi}_{rev}(k) \quad (37)$$

In this way, the method may allow to counteract too strong attenuations by a postfilter and thus, may improve the speech intelligibility of the processed signal.

The estimated noise component $\hat{\Phi}_{A_N}(k)$ of the disturbing components at the output of the beamformer 110 may be expressed according to equations (34) and (16) by $$\hat{\Phi}_{A_N}(k) = W_{eq}(k)\cdot\hat{\Phi}_{U_R}(k) + W_{eq}(k)\cdot\hat{\Phi}_{U_N}(k) \quad (38)$$

$$= \sum_{j=0}^{L-1} W_{eq}(k)\Phi_{X_D}(k-j)G(j) + W_{eq}(k)\cdot\hat{\Phi}_{U_N}(k) \quad (39)$$

$$= \Phi_{rev}(k) + W_{eq}(k)\cdot\hat{\Phi}_{U_N}(k) \quad (40)$$

Besides the component $W_{eq}(k)\cdot\hat{\Phi}_{U_N}(k)$ which corresponds to noise, there may be the component $\Phi_{rev}(k)$ which corresponds to the reverberation. This component may not be taken for the real reverberation component $\Phi_{A_R}(k)$ at the output of the beamformer 110 because the factor $W_{eq}$ may be adapted to the noise and not to the reverberation. As has already been mentioned, the component al $\Phi_{rev}(k)$ may cause problems as it may include early reverberation components.

In view of the relation expressing a convolution in equation (34), an estimate for $\Phi_{rev}(k)$ may be generated by simulating the power impulse response G in each subband by means of an adaptive filter $\hat{G}$. The generated estimated reverberation component $\hat{\Phi}_{rev}(k)$ may then be subtracted from the estimated noise component $\hat{\Phi}_{A_N}(k)$:

$$\check{\Phi}_{A_N}(k)=\hat{\Phi}_{A_N}(k)-\hat{\Phi}_{rev}(k) \quad (41)$$

The estimated reverberation component may in principle be generated as follows:

$$\hat{\Phi}_{rev}(k) = \sum_{j=0}^{L_H-1} \hat{G}(k,j)V(k-j) \quad (42)$$

$$= \hat{G}(k)^T \cdot V(k) \quad (43)$$

where $\hat{G}(k)$ denotes the real-valued vector of filter coefficients of the filter $\hat{G}$ 210

$$\hat{G}(k)=(\hat{G}(k,0),\hat{G}(k,1),\ldots,\hat{G}(k,L_H-1))^T \quad (44)$$

and V(k) denotes the also real-valued vector of the previous $L_H$ values at the input of the filter:

$$V(k)=(V(k),V(k-1),\ldots,V(k-L_H+1))^T \quad (45)$$

The excitation V(k) of the adaptive filter is described in more detail below. The vector of the filter coefficients $\hat{G}(k)$ may be adjusted such that the expectation value of the square error $$E\{(e(k))^2\} = E\{(\tilde{\Phi}_{A_N}(k) - \hat{\Phi}_{rev}(k))^2\} \quad (46)$$

$$= \Phi_e(k) \quad (47)$$

is minimized. Here, $\tilde{\Phi}_{A_N}(k)$ denotes the estimate for a zero-average noise component which will be described below.

To minimize the error functional $\Phi_e(k)$ of equation (47), several adaptation methods may be used. Here, the Normalized Least-Mean-Square (NLMS) method may be used. The NLMS algorithm may be of advantage for practical and economic applications. It may provide a good compromise in view of convergence properties and the required computing power (E. Hänsler, G. Schmidt: Acoustic Echo and Noise Control: A Practical Approach. Wiley IEEE Press, New York, N.Y. (USA), 2004; and: E. Hansleri: Statistische Signale. Springer Verlag, Berlin (Germany), 2001). The adaptation rule for the filter coefficients may be given by:

$$\hat{G}(k) = \hat{G}(k-1) + \beta(k)\frac{e(k)\cdot V(k)}{V^T(k)V(k)} \quad (48)$$

where β(k) denotes the step size for the adaptation. To assure a robust behavior, it may be necessary to introduce an adaptation control which is frequency selective. Here, standard methods may be employed. Good results may be achieved with the method described by E. Hänsler and G. Schmidt 2004. There, the step size may be controlled in dependence on the error power $\Phi_e(k)$. Furthermore, in an embodiment, adaptation may only take place during speech activity. A detector for speech activity may usually be available with a typical implementation of an adaptive beamformer 110.

An essential parameter of the method may be the length $L_H$ of the adaptive filter $\hat{G}(k)$ 210. By choosing a suitable value for $L_H$, it may be determined which part of the impulse response G is simulated. In this way, there may be the possibility of defining the size of the temporal window during which the reverberation components are attributed to the wanted signal component. Furthermore, an adaptation to the used subband may be possible by this parameter. As the difference in time between two frames of data often may be selected differently for different applications, the length $L_H$ of the filter may be adapted to the respective difference.

In the following, the form of the estimate for a zero-average noise component $\tilde{\Phi}_{A_N}(k)$ may be derived. The estimated noise component $\hat{\Phi}_{A_N}(k)$ may comprise a contribution by reverberation components and a contribution by the (adjusted) noise:

$$\hat{\Phi}_{A_N}(k)=\Phi_{rev}(k)+W_{eq}(k)\cdot\hat{\Phi}_{U_N}(k) \quad (49)$$

The first component may cause the above-mentioned problem of including early reverberation components and may therefore have to be simulated by the adaptive filter $\hat{G}$ 210, while the second part $W_{eq}\cdot\hat{\Phi}_{U_N}(k)$ may represent a disturbance for the reverberation filter $\hat{G}$ 210. As the average of the disturbance may not be zero, the estimate of the reverberation component generated by the filter $\hat{G}$ 210 may have a bias.

Hence, it may be desired to remove the disturbance. As $W_{eq}\cdot\overline{\Phi}_{U_N}$ may vary with time, it may not generally be possible to estimate this value to subtract it. An estimate may be determined only as an average over time because no other discrimination between reverberation and noise components may be possible. Hence, the estimated noise component $\hat{\Phi}_{A_N}(k)$ may be averaged over time and the resulting smoothed noise component $\hat{\Phi}_N(k)$ may be subtracted from $\hat{\Phi}_{A_N}(k)$. Computation of the smoothed noise component may be carried out according to:

$$\hat{\Phi}_N(k) = \begin{cases} \hat{\Phi}_N(k-1)(1+\epsilon) & \text{for } \hat{\Phi}_{A_N}(k) \geq \Phi_N(k-1) \\ \hat{\Phi}_N(k-1)(1-\epsilon) & \text{for } \hat{\Phi}_{A_N}(k) < \Phi_N(k-1) \end{cases} \tag{50}$$

Here, $\epsilon$ may be a predetermined constant. A modification of $\hat{\Phi}_N(k)$ may be applied only during speech pauses. Finally, the smoothed noise component $\hat{\Phi}_N(k)$ may be subtracted from the estimated noise component $\hat{\Phi}_{A_N}(k)$ and one may obtain the estimate for a zero-average noise component $\tilde{\Phi}_{A_N}(k)$ in the zero average noise estimation unit 220:

$$\Phi_{A_N}(k) = \hat{\Phi}_{A_N}(k) - \hat{\Phi}_N(k) \tag{51}$$

$$= \Phi_{rev}(k) + W_{eq}(k)\cdot\overline{\Phi}_{U_N}(k) - \hat{\Phi}_N(k) \tag{52}$$

$$= \Phi_{rev}(k) + \Delta_U(k) \tag{53}$$

The resulting error $\Delta_U(k)$ arises just from the component $W_{eq}\cdot\overline{\Phi}_{U_N}(k)$ which is not estimated by $\hat{\Phi}_N(k)$ because of the averaging over time. In particular, the resulting error now has an average of zero. Hence, this component may not disturb, on average, the adaptation of the filter $\hat{G}$. So, the estimate for a zero-average noise component $\hat{\Phi}_{A_N}(k)$ may fluctuate during speech pauses around the average value of zero. If this signal assumes negative values, these may only be caused by the remaining disturbance $\Delta_U(k)$, as the estimated value $\Phi_{rev}(k)$ is defined as positive.

In the process of determining the excitation signal of the adaptive filter $\hat{G}$ 210, two points may have to be taken into account. The main problem may be that the filter, in principle, may only be excited by direct sound components. However, those may not be available. The signal with the best signal to noise ratio may be the output signal of the beamformer. Hence, the input signal $\hat{\Phi}_A(k)$ as provided by the beamformer may be used for excitation of the filter $\hat{G}(k)$ 210.

However, the power at the output of the beamformer may comprise the power of the signal with reverberation $A_S(k)$ as well as the power of the noise $A_N(k)$:

$$\Phi_A(k)=\Phi_{A_S}(k)+\Phi_{A_N}(k) \tag{54}$$

As no better alternative may be available, the input signal $\hat{\Phi}_A(k)$ may be used only if components of direct sound have been detected. The detection in sound detector 230 of such components may be achieved by the quotient:

$$\mu_Y(k) = \frac{\hat{\Phi}_A(k)}{\hat{\Phi}_{A_N}(k)} \tag{55}$$

As the denominator may still comprise all components of reverberation, this quotient may be greater than 1 particularly if components of direct sound are present. Hence, a threshold value may be set for this quotient:

$$\kappa(k) = \begin{cases} 1 & \text{for } \mu_Y(k) \geq \mu_0 \\ \text{otherwise} & 0 \end{cases} \tag{56}$$

where $\mu_0\approx1.5$. The second problem with determining the excitation signal may be the noise power $\Phi_{A_N}(k)$ at the beamformer output. Caused by the factor $W_{eq}(k)$, it may have about the same average over time as the estimated noise component $\hat{\Phi}_{A_N}(k)$ which may be disturbed by $\Phi_{rev}(k)$. Therefore, the average over time of the noise at the beamformer output may be removed, like in the determination of the estimate for a zero-average noise component, by subtracting the smoothed noise component $\hat{\Phi}_N(k)$ (220). The excitation of the filter may therefore be:

$$V(k) = \kappa(k)\cdot(\hat{\Phi}_A(k) - \hat{\Phi}_N(k)) \tag{57}$$

$$= \kappa(k)\cdot\Phi_A(k) \tag{58}$$

By the binary value $\kappa(k)$, it may be prevented that the reverberation filter 210 is excited by reverberation components. In addition, this mechanisms assure that the reverberation filter 210 is excited only if sound from a predetermined direction hits the group of microphones 150. Hence, sound from other directions than a predetermined direction may be suppressed by the postfilter 130. The reverberation may pass the postfilter 130 only if the reverberation filter G(k) 210 has detected a correlation between direct sound (from the predetermined direction) and reflection components (from an arbitrary direction). This effect makes out the jointly using spatial as well as temporal criteria as mentioned at the beginning.

In an exemplary embodiment, the described method has been implemented and analyzed in Matlab. For this purpose, an array of M=4 microphones with a robust implementation of the GSC according to M. Brandstein, D. Ward 2001 has been employed. The sampling frequency is $f_s$=11025 Hz. A Distributed Fourier Transformation (DFT)-length of 256 samples with a shift of 64 samples between frames has been chosen. To generate the microphone signals, impulse response measurements taken in a meeting room have been used. The reverberation time of this room is approximately 600 milliseconds.

From this data, the microphone signals were generated by convolving a pure speech signal with the impulse response. Subsequently, the background noise of a ventilator, obtained in the same room, has been added. The signal-to-noise ratio has been set to 12 dB.

FIG. 7 shows the undisturbed speech signal together with the (disturbed) microphone signal. FIGS. 7 *a* and *b* present the power density $\hat{\Phi}_{X_D}(\mu,k)$ and the time signal $x_D(n)$ of the clean direct sound, and FIGS. 7 *c* and *d* present the power density $\hat{\Phi}_X(\mu,k)$ and the time signal x(n) of the disturbed microphone signal over a period of 12 seconds. FIGS. 7*a* and 7*c* show spectra between 0 and 5000 Hz (spread over the y-axis) over the 12-seconds-period.

Figure 8A:
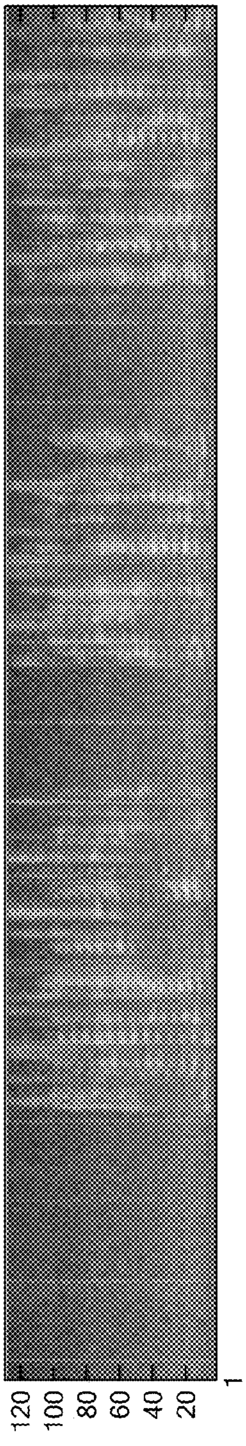
FIG. 8 illustrates examples of the input signal (part a), of the estimate for a zero-average input signal (part b) and the estimated reverberation component (part c) derived from the signals illustrated in FIG. 7.
Figure 8B:
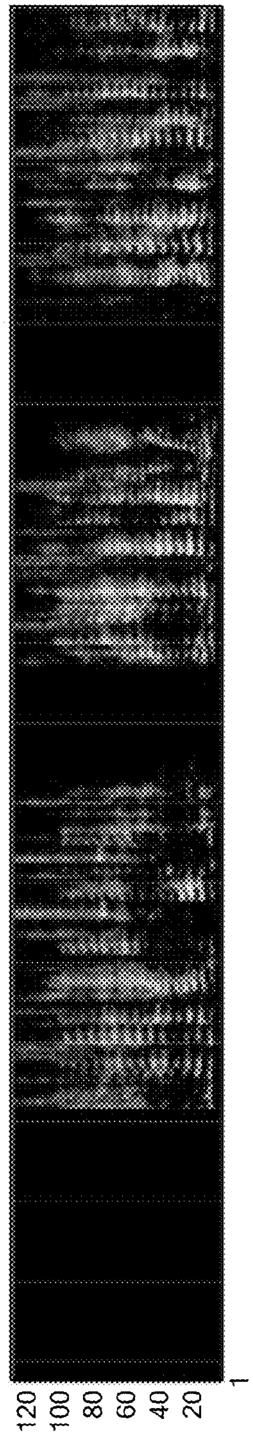
Figure 8C:
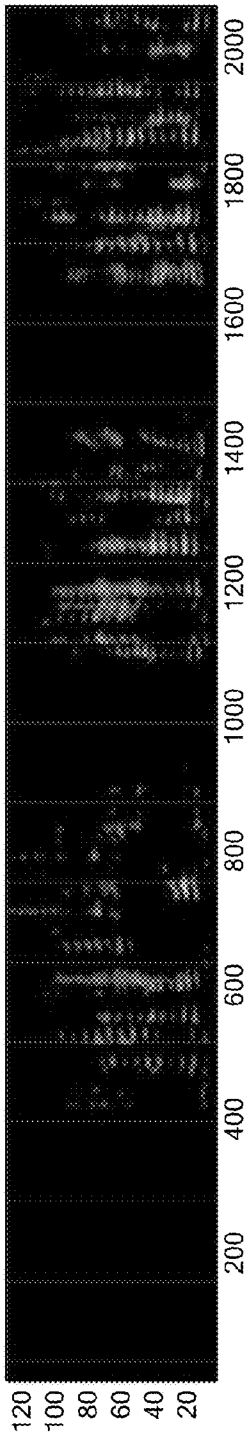

FIG. 8 shows the input signal $\hat{\Phi}_A(\mu,k)$ at the output of the beamformer (part a) as well as the excitation signal V(μ,k) of the reverberation filter G(μ,k) derived from the input signal (part b). The same figure also presents in part c the estimated reverberation component $\hat{\Phi}_{rev}(\mu,k)$ generated by the reverberation filter. The block index k denoting the time ranges from 0 to 2000 (x-axis), the subband index μ ranges from 1 to 120 (y-axis). It can be recognized that the filter converges during the first two utterances. The power of the estimated reverberation component is recognizably lower than that of the excitation signal, but follows its progression in time and frequency. The filter length $L_H$ in this embodiment is $L_H=1$ for each subband.

Figure 9A:
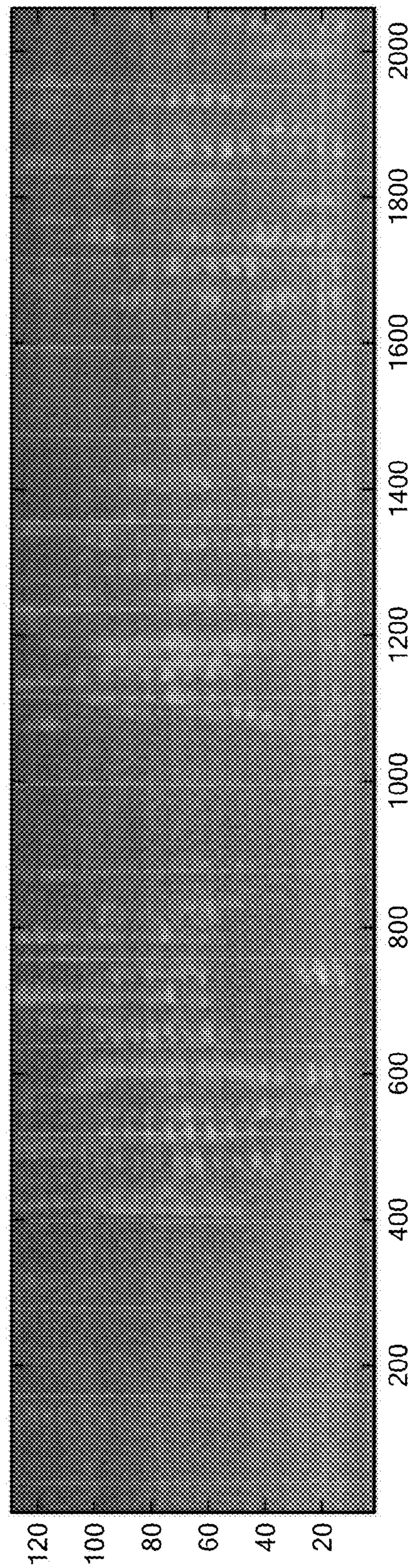
FIG. 9 illustrates an exemplary comparison between the estimated noise component (part a) and the modified estimate of the noise component (part b)
Figure 9B:
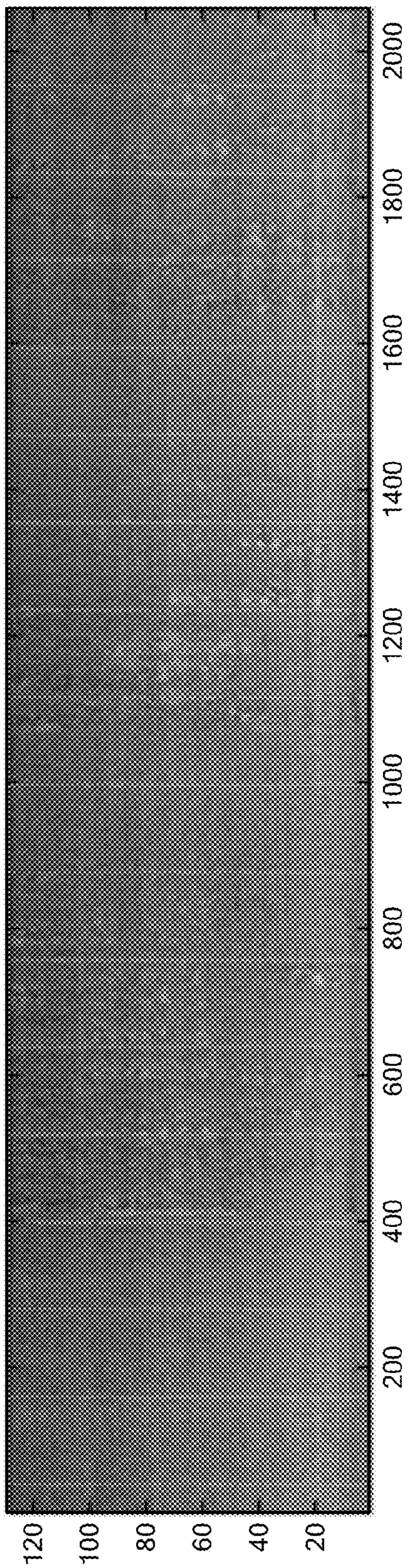

The effect of subtracting the estimated reverberation component from the estimated noise component, which has been previously used in the postfilter, is shown in FIG. 9, wherein the block indices are again spread over the x-axis, while the subband index is spread over the y-axis. In part a, the estimated noise component $\hat{\Phi}_{A_N}(\mu,k)$ as previously used in the postfilter is displayed. The undesired reverberation components can be clearly recognized. In part b, the spectrum of the modified estimate of the noise component $\check{\Phi}_{A_N}(\mu,k)$ is presented. The reverberation components are recognizably reduced therein.

Figure 10A:
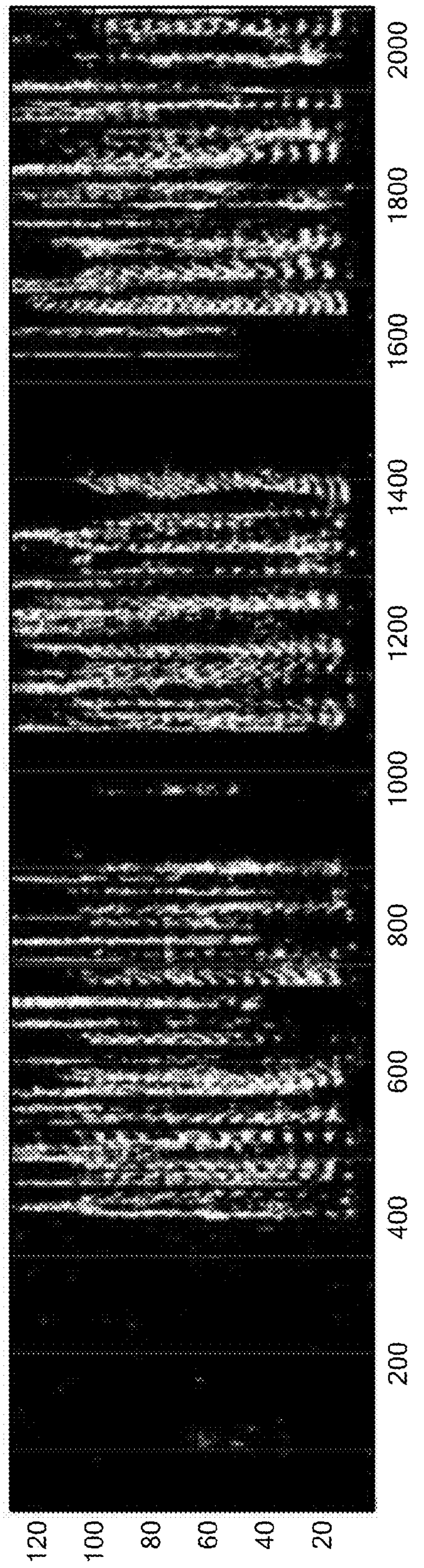
FIG. 10 illustrates an example of the filter coefficients of the postfilter, which reduces noise using the estimated noise component (part a) and using the modified estimate of the noise component as determined according to the invention (part b)
Figure 10B:
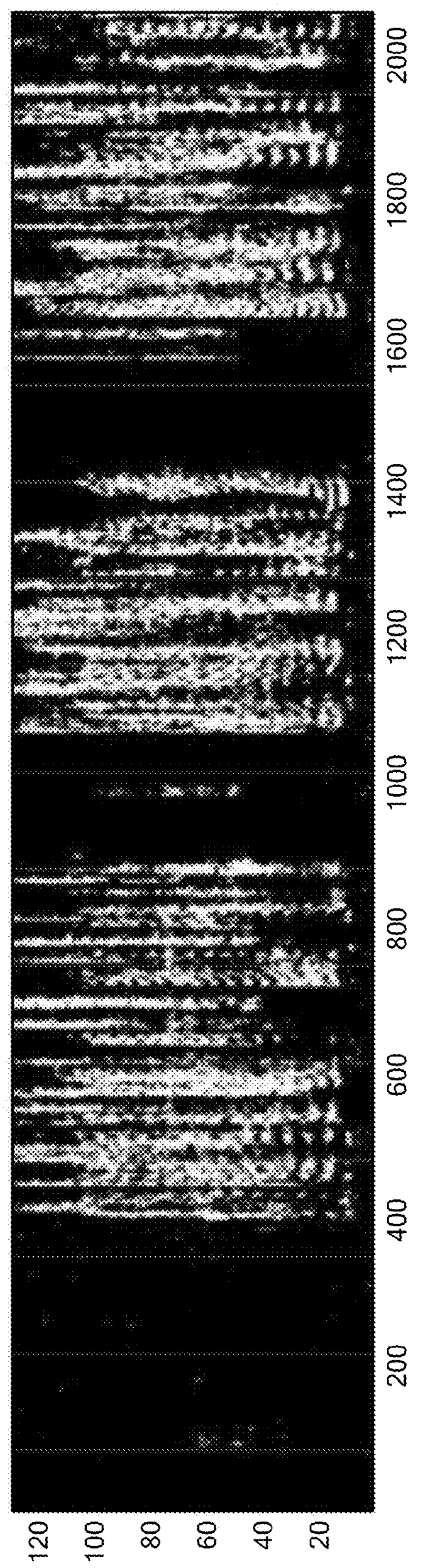

FIG. 10 presents the coefficients H(μ,k) of the postfilter for all subbands, wherein the x-axis shows the block index and the y-axis shows the subband index. In part a, the coefficients for the case of filtering the estimated noise component $\hat{\Phi}_{A_N}(\mu,k)$ are displayed. The coefficients for the case of filtering the modified estimate of the noise component $\check{\Phi}_{A_N}(\mu,k)$ are presented part b. By comparing part a to part b, it can be seen that the postfilter is now opened for a longer time. Even if this change may seem small, the consequence is a distinctly different sound reproduction. The filter length in this case was $L_H=3$.

Figure 11A:
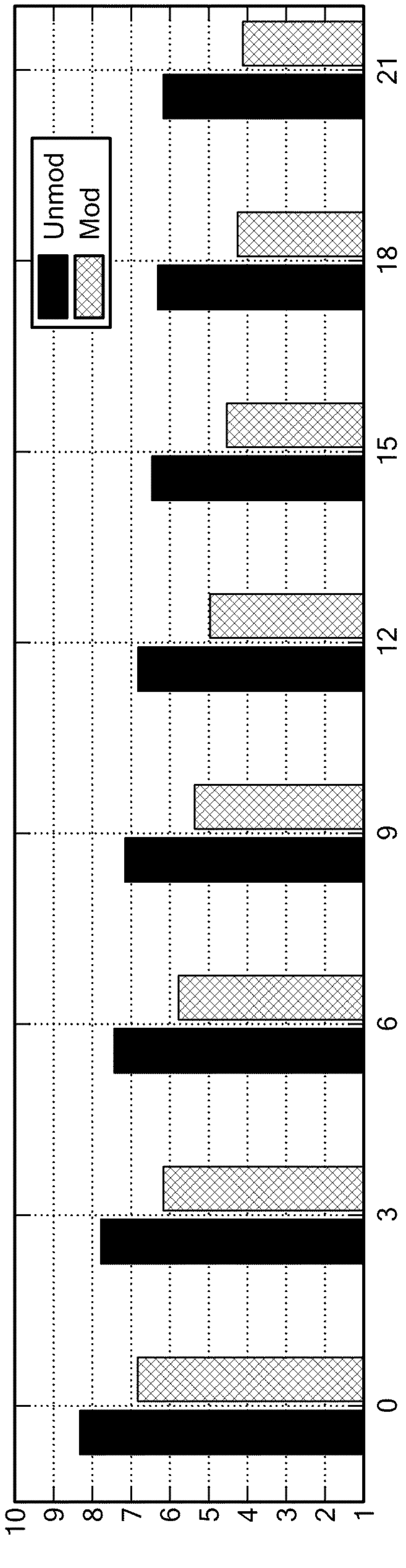
FIG. 11 Illustrates, in part a, an exemplary comparison between the log-spectral distortion without (left columns) and with (right columns) using the invention. Part b displays, for this example, the difference between both cases.
Figure 11B:
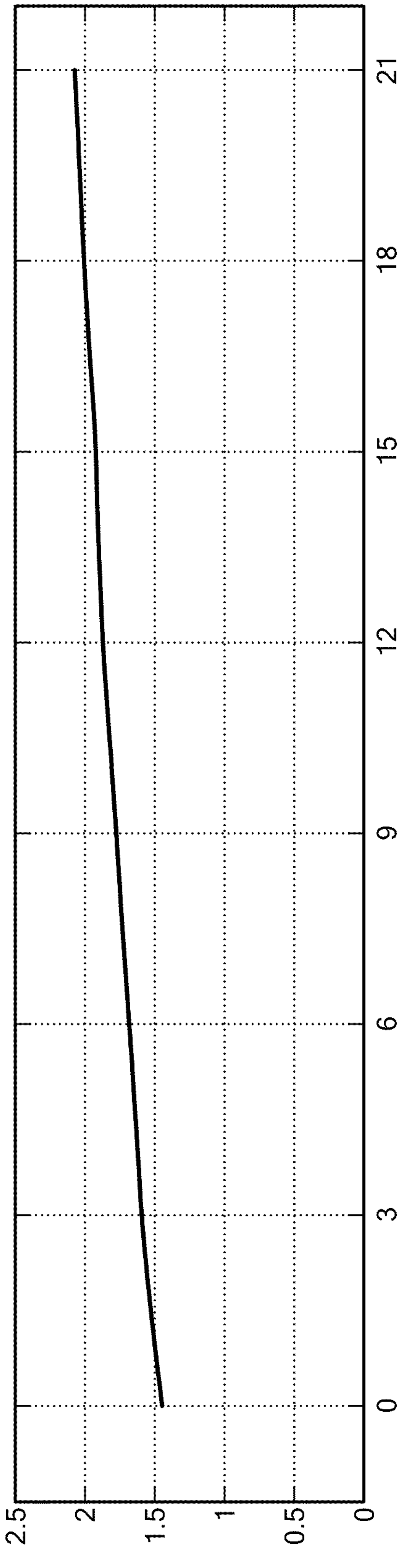

To measure the distortions of a speech signal, so called "spectral distance measures" may be used. For that purpose, a reference signal has to be available. Then, the square deviation of the spectrum to be assessed from the reference signal may be determined. This may be done based on the logarithmic power spectra. Therefore, this measure is called Log-Spectral-Distance, in short: LSD. To demonstrate the achieved improvement, the LSD as a function of the signal-to-noise-ratio at the microphone is illustrated as an example in FIG. 11. Part a illustrates the log-spectral distortion of a prior system (left columns) compared to the distortion in an embodiment of a system performing the new method according to the invention (right columns). Part b shows the difference between both values. It can be seen that 2 dB are gained on average. The gain may be dependent on the acoustical circumstances. In this example, the reverberation time of the room is $T_{60}=600$ ms. The distance between the speaker and the microphone array is 2 m.

The embodiments of the invention described above are intended to be merely exemplary; numerous variations and modifications will be apparent to those skilled in the art. All such variations and modifications are intended to be within the scope of the present invention as defined in any appended claims.

Although the previously discussed embodiments of the present invention have been described separately, it is to be understood that some or all of the above described features can also be combined in different ways. The discussed embodiments are not intended as limitations but serve as examples illustrating features and advantages of the invention. The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a signal processing system and that the signal processing system may include one or more processors for processing computer code representative of the foregoing described methodology. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

What is claimed is:

1. A computer implemented method for removing a reverberation component from a noise component of an input signal, comprising:

estimating, by a processor, the noise component of a power density spectrum of the input signal by filtering the input signal with a blocking matrix, wherein output from the blocking matrix includes the noise component and the reverberation component;

estimating, by a processor, the reverberation component in the noise component;

removing, by a processor, the reverberation component from the noise component to obtain a modified estimate of the noise component, wherein estimating the reverberation component comprises using an adaptive filter to simulate a power impulse response of the reverberation component in the power density spectrum of the input signal.

2. The computer implemented method according to claim 1, further comprising adapting the adaptive filter to minimize a difference between the reverberation component and the noise component.

3. The computer implemented method of claim 1 wherein the reverberation component includes (i) an early reverberation component following sound of an event causing reverberation and (ii) a late reverberation component occurring later in time than the early reverberation component.

4. The computer implemented method of claim 3 wherein the adaptive filter is used to estimate the early reverberation component, which is removed from the noise component.

5. The computer implemented method of claim 3 further comprising using a post-filter to suppress the late reverberation component.

6. The computer implemented method of claim 3 further comprising estimating the early reverberation component based on, a correlation in time with a wanted signal component of the input signal.

7. The computer implemented method of claim 3 further comprising choosing a length for the adaptive filter to simulate a portion of the power impulse response.

8. The computer implemented method of claim 7 wherein the portion of the power impulse response corresponds to the early reverberation component.

9. A computer implemented method for removing a reverberation component from a noise component of an input signal, comprising:

estimating, by a processor, the noise component in the input signal by filtering the input signal with a blocking matrix, wherein output from the blocking matrix includes the noise component and the reverberation component;

estimating, by a processor, the reverberation component in the noise component;

removing, by a processor, the estimated reverberation component from the estimated noise component to obtain a modified estimate of the noise component, wherein estimating the reverberation component comprises:

determining an estimate of a zero average noise component with a temporal average of zero based on the estimated noise component.

10. The computer implemented method according to claim 9, further comprising, before determining the estimate of the zero-average noise component:

detecting whether a wanted component is present in the input signal, and determining a smoothed noise component based on the estimated noise component if no wanted component is detected;

and wherein determining the zero-average noise component is also based on the smoothed noise component.

11. The computer implemented method according to claim 9, wherein estimating the reverberation component further comprises a computer process for:

determining an estimate of a zero-average input signal with a temporal average of zero based on the input signal; and performing the step of filtering the input signal using the estimate of the zero-average input signal.

12. A computer program product, tangibly embodied a non-transitory computer readable storage medium, for removing a reverberation component from a noise component of an input signal, the computer program product including instructions operable to cause a data processing apparatus to:

estimate the noise component of a power density spectrum of the input signal by filtering the input signal with a blocking matrix, wherein output from the blocking matrix includes the noise component and the reverberation component;

estimate the reverberation component in the noise component using an adaptive filter to simulate a power impulse response of the reverberation component in the power density spectrum of the input signal;

remove the reverberation component from the noise component to obtain a modified estimate of the noise component.

13. The computer program product according to claim 12, further including instructions operable to cause the data processing apparatus to adapt the adaptive filter to minimize a difference between the reverberation component and the noise component.

14. The computer program product according to claim 12 further including instructions operable to cause the data processing apparatus to:

determine an estimate of a zero-average noise component with a temporal average of zero based on the estimated noise component to estimate the reverberation component in the noise component.

15. The computer program product according to claim 14 further including instructions operable to cause the data processing apparatus to, before determining the estimate of the zero-average noise component:

detect whether a wanted component is present in the input signal, and determine a smoothed noise component based on the estimated noise component if no wanted component is detected;

and wherein determining the zero-average noise component is also based on the smoothed noise component.

16. The computer program product according to claim 14 further including instructions operable to cause the data processing apparatus to:

determine an estimate of a zero-average input signal with a temporal average of zero based on the input signal; and perform the step of filtering the input signal using the estimate of the zero-average input signal to estimate the reverberation component in the noise component.

17. The computer program product according to claim 12 the reverberation component includes (i) an early reverberation component following sound of an event causing reverberation and (ii) a late reverberation component occurring later in time than the early reverberation component.

18. The computer program product according to claim 17 wherein the adaptive filter is used to estimate the early reverberation component, which is removed from the noise component.

19. The computer implemented method of claim 17 further including instructions operable to cause the data processing apparatus to suppress the late reverberation component using a post-filter.

20. The computer implemented method of claim 17 further including instructions operable to cause the data processing apparatus to estimate the early reverberation component based on a correlation in time with a wanted signal component of the input signal.

21. The computer implemented method of claim 17 further including instructions operable to cause the data processing apparatus to choose a length for the adaptive filter to simulate a portion of the power impulse response.

22. The computer implemented method of claim 21 wherein the portion of the power impulse response corresponds to the early reverberation component.

* * * * *